US007085074B2

(12) United States Patent
Wada

(10) Patent No.: US 7,085,074 B2
(45) Date of Patent: Aug. 1, 2006

(54) LENS BARREL HAVING CAM-CYLINDER WITH CAM-GROOVE AND VARYING THICKNESS, LENS BARREL HAVING GUIDE-CYLINDER WITH VARYING WALL THICKNESS, AND LENS BARREL HAVING THE CAM-CYLINDER AND THE GUIDE-CYLINDER

(75) Inventor: Hiroyuki Wada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/236,715

(22) Filed: Sep. 28, 2005

(65) Prior Publication Data

US 2006/0023321 A1    Feb. 2, 2006

Related U.S. Application Data

(63) Continuation of application No. 10/868,782, filed on Jun. 17, 2004, now Pat. No. 6,992,836.

(30) Foreign Application Priority Data

Jun. 24, 2003    (JP) ............................. 2003-178933

(51) Int. Cl.
  *G02B 15/14*    (2006.01)
(52) U.S. Cl. ...................... 359/701; 359/694
(58) Field of Classification Search ........ 359/694–704, 359/819–823
  See application file for complete search history.

(56) References Cited

U.S. PATENT DOCUMENTS

| 5,410,432 A | | 4/1995 | Kobayashi | 359/740 |
| 5,515,135 A | * | 5/1996 | Katayama et al. | 396/85 |
| 5,587,754 A | | 12/1996 | Katayama et al. | 396/144 |
| 5,602,607 A | | 2/1997 | Kato et al. | 396/349 |
| 6,437,924 B1 | | 8/2002 | Azegami | 359/694 |

FOREIGN PATENT DOCUMENTS

JP    2002-277711    9/2002

* cited by examiner

*Primary Examiner*—Ricky Mack
*Assistant Examiner*—M. Hasan
(74) *Attorney, Agent, or Firm*—Fitzpatrick, Cella, Harper & Scinto

(57) ABSTRACT

A lens barrel includes a lens-holding cylinder which supports a lens and is provided with a cam-follower and a rectilinear key; a cam-cylinder having a cam-groove which engages with the cam-follower so as to apply a driving force to the lens-holding cylinder in the optical-axis direction; and a guide cylinder which is enclosed by the cam-cylinder and has a rectilinear guide opening that engages with the rectilinear key so as to guide the lens-holding cylinder in the optical-axis direction. A segment of the cam-cylinder adjacent to an object to be photographed has a greater wall thickness such that the cam-cylinder has a level difference. A portion of the guide cylinder adjacent to an object to be photographed, which corresponds to the level difference of the cam-cylinder, is made thinner by the amount of the level difference.

9 Claims, 6 Drawing Sheets

LENS BARREL HAVING CAM-CYLINDER WITH CAM-GROOVE AND VARYING THICKNESS, LENS BARREL HAVING GUIDE-CYLINDER WITH VARYING WALL THICKNESS, AND LENS BARREL HAVING THE CAM-CYLINDER AND THE GUIDE-CYLINDER

This application is a continuation of application Ser. No. 10/868,782 filed Jun. 17, 2004 now U.S. Pat. No. 6,992,836.

BACKGROUND OF THE INVENTION

1. Field of the Invention

The present invention relates to extensible lens-barrels used in, for example, cameras.

2. Description of the Related Art

A typical extensible lens-barrel is disclosed in, for example, Japanese Patent Laid-Open No. 2002-277711. This extensible lens-barrel utilizes a differential extensible mechanism in which a differential cylinder and a rectilinear-regulation part rotate relatively with each other such that lens-barrel components disposed adjacent to the corresponding inner and outer peripheries of the differential cylinder and the rectilinear-regulation part are extended or retracted.

FIGS. 4 to 6 illustrate a digital camera which is provided with the lens barrel disclosed in Japanese Patent Laid-Open No. 2002-277711. In detail, FIG. 4 illustrates the operational state of the camera, that is, the state in which the lens barrel is extended. On the other hand, FIG. 6 illustrates the non-operational state of the camera, that is, the state in which the lens barrel is retracted. FIG. 5 is a sectional view of one of first-lens-holder pins 121a shown in FIG. 4 taken along line 5—5.

Referring to FIGS. 4 to 6, the camera is provided with a camera body 101, a liquid crystal display unit 102, and a cover 103. The liquid crystal display unit 102 and an operating part, which is not shown in the drawings, are included in the cover 103, and the camera body 101 is covered with the cover 103. The camera body 101 includes a viewfinder block 104; a hard substrate 105 having an electrical circuit; a battery; a recording unit; a strobe light; and an extensible lens-barrel 106. The battery, the recording unit, and the strobe light are not shown in the drawings.

The structure of the lens-barrel 106 used for digital cameras of this type will now be described.

The camera is further provided with a CCD (charge-coupled device) 107, i.e. an image-capturing element; a low-pass filter 108; a base 109; a third lens 110; a third-lens holder 111; and a lens moving mechanism 112 which includes a step motor and a thread-rolling unit. The CCD 107 and the low-pass filter 108 are fixed to the base 109. The third-lens holder 111, which supports the third lens 110, and the lens moving mechanism 112 are attached to the base 109. The lens moving mechanism 112 moves the third lens 110 in the optical-axis direction. Furthermore, the camera includes a fixed cylinder 113, a drive ring 114, and a gear array 115. The fixed cylinder 113 is fixed to the base 109, and the inner periphery of the fixed cylinder 113 is provided with a cam-groove 113a and a rectilinear opening 113b. The drive ring 114 is disposed around the fixed cylinder 113 and can rotate with respect to the optical axis. The outer periphery of the drive ring 114 is provided with a gear portion 114a. The drive ring 114 is driven by a lens-barrel driving unit such as a lens-barrel motor, which is not shown in the drawings, and the gear array 115 via the gear portion 114a. Furthermore, the inner periphery of the drive ring 114 is provided with a drive opening 114b.

The fixed cylinder 113 encloses a cam-cylinder 116 whose outer periphery is provided with a cam-pin 116a and a drive pin 116b. The cam-pin 116a engages with the cam-groove 113a of the fixed cylinder 113, and the drive pin 116b engages with the drive opening 114b of the drive ring 114. Furthermore, the inner periphery of the cam-cylinder 116 is provided with first cam-grooves 116c and second cam-grooves 116d. When the drive ring 114 rotates, the drive pin 116b engages with the drive opening 114b and allows the cam-cylinder 116 to rotate with respect to the optical axis while the cam-pin 116a moves along the cam-groove 113a.

The camera is further provided with a rectilinear cylinder 117 which is enclosed by the cam-cylinder 116, a first lens 118, a lens barrier 119, a barrier driving unit 120, and a first-lens-holding cylinder 121. The rectilinear cylinder 117 includes a rectilinear key 117a which engages with the rectilinear opening 113b of the fixed cylinder 113. Moreover, with respect to the optical-axis direction, one end of the rectilinear cylinder 117 is provided with bayonets 117b and the other end is provided with a flange 117c such that the cam-cylinder 116 is disposed between the bayonets 117b and the flange 117c. Thus, the rectilinear cylinder 117 can move in the optical-axis direction, but does not rotate with the cam-cylinder 116. The rectilinear cylinder 117 is further provided with three first rectilinear openings 117d which extend through the cylinder wall, and three second rectilinear openings 117e which also extend through the cylinder wall. The lens barrier 119 is for protecting the first lens 118 when the lens barrel is in its retracted state. The barrier driving unit 120 is for opening and closing the lens barrier 119. The lens barrier 119 and the barrier driving unit 120 are fixed adjacent to the front of the first-lens-holding cylinder 121.

The first-lens-holding cylinder 121 includes three pins 121a which engage with the corresponding first cam-grooves 116c of the cam-cylinder 116, and three rectilinear keys 121b which engage with the corresponding first rectilinear openings 117d of the rectilinear cylinder 117. The first-lens-holding cylinder 121 is only permitted to move rectilinearly by the rectilinear cylinder 117, and therefore, does not rotate with the cam-cylinder 116. Thus, the pins 121a slide along the first cam-grooves 116c of the cam-cylinder 116 such that the first-lens-holding cylinder 121 moves forward or backward in the optical-axis direction.

The camera is further provided with a second lens 122, a second-lens holder 125, a shutter blade 123, and a shutter driving unit 124. The second lens 122 is supported by the second-lens holder 125. The shutter blade 123 and the shutter driving unit 124 are attached to the second-lens holder 125. The second-lens holder 125 includes two cam-pins, which are not shown in the drawings, a bias pin 127, and rectilinear keys 125b. The two cam-pins engage with the corresponding second cam-grooves 116d of the cam-cylinder 116. The bias pin 127 is biased outward against one of the second cam-grooves 116d in the radius direction of the lens barrel by a spring 126. The rectilinear keys 125b engage with the corresponding second rectilinear openings 117e of the rectilinear cylinder 117.

The second-lens holder 125 is permitted to move only in the optical-axis direction by the second rectilinear openings 117e, and does not rotate with the cam-cylinder 116. This means that the second-lens holder 125 does not rotate with respect to the camera body 101 but moves forward or backward in the optical-axis direction with the cam-cylinder 116 by engaging with the second cam-grooves 116d.

The circuit of the hard substrate 105 is electrically connected to the lens-barrel driving unit, the lens moving mechanism 112, and the shutter driving unit 124 via a flexible printed substrate 128.

In the digital camera provided with such a differential extensible lens-barrel, when the operating part in the cover 103 is operated for switching the camera from a non-operational state in FIG. 6 to an operational state in FIG. 4, the lens-barrel driving unit is activated via the circuit on the hard substrate 105. Thus, the drive ring 114 is rotated such that the cam-cylinder 116 and the first-lens-holding cylinder 121 are driven forward or backward in the optical-axis direction. Moreover, the second-lens holder 125 moves outward in the optical-axis direction. Furthermore, the lens moving mechanism 112 is also activated to move the third lens 110. Accordingly, the optical components are positioned to a state shown in FIG. 4.

When the shutter is released in the operational state, the camera performs automatic focusing and automatic exposure, and then processes and records the image.

FIG. 8 illustrates a broken lens-barrel caused by, for example, dropping the camera when the lens barrel was in an extended state. More specifically, the front surface of the lens barrel, for example, was subjected to a large impact when the camera was dropped.

The front surface of the lens barrel was subjected to an impact as indicated by an arrow in FIG. 8. This impact caused one of the pins 121a of the first-lens-holding cylinder 121 to disengage from the corresponding first cam-groove 116c.

According to Japanese Patent Laid-Open No. 2002-277711, as shown in FIG. 7, each second rectilinear opening 117e of the rectilinear cylinder 117 is provided with claw portions 117f and 117g which extend toward each other in the circumferential direction of the lens barrel. Moreover, the first-lens-holding cylinder 121 has rectilinear guide grooves, i.e. rails 121c and 121d, which are engageable with the claw portions 117f and 117g, respectively, in the radius direction of the lens barrel. The rails 121c and 121d extend in the optical-axis direction. Consequently, the claw portions 117f and 117g and the rails 121c and 121d prevent the displacement of the cam-follower, i.e. the pin 121a, from the cam-groove 116c. This means that even if an impact against the first-lens-holding cylinder 121 imparts a force against the cam-follower, the cam-follower is prevented from disengaging from the cam-groove 116c in the radius direction of the lens barrel. Accordingly, this prevents the lens barrel from breaking.

With such a structure, however, there are cases where a large impact may force the cam-follower, i.e. the pin 121a, to become wedged into the cam-groove 116c, causing the lens barrel to break.

As a countermeasure to this problem, it is possible to use a harder material for the cam-cylinder 116, or to provide a greater depth for the cam-grooves 116c so that larger portions of the pins 121a can be embedded in the cam-grooves 116c.

A typical lens-barrel used for cameras is normally formed of engineering plastics, such as polycarbonate. The reason for this is that engineering plastics have a suitable weight to strength ratio, and moreover, have high flexibility in view of providing complex structures. Furthermore, engineering plastics contribute to cost reduction. Generally, for increasing the strength, pellets formed of, for example, carbon fiber or glass fiber are added to the plastic. These additives, however, cause problems and are not desirable due to the fact that they lower the reliability of the mold used for the fabrication of the lens barrel. On the other hand, providing a greater depth for the cam-grooves 116c increases the wall thickness of the cam-cylinder 116 and leads to a larger outer diameter of the cam-cylinder 116. This results in the entire lens barrel having a larger outer diameter, and thus goes against the trend in recent years of size and weight reduction.

SUMMARY OF THE INVENTION

Accordingly, it is an object of the present invention to provide a compact, lightweight lens-barrel that is durable against a large impact. A lens barrel according to the present invention includes a lens-holding cylinder which supports a lens and is provided with a cam-follower and a rectilinear key; a cam-cylinder having a cam-groove which engages with the cam-follower so as to apply a driving force to the lens-holding cylinder in the optical-axis direction; and a guide cylinder which is enclosed by the cam-cylinder and has a rectilinear guide opening that engages with the rectilinear key so as to guide the lens-holding cylinder in the optical-axis direction. The cam-cylinder has a first segment and a second segment, and the wall thickness of the first segment is greater than that of the second segment such that the first segment has a higher elevation than the second segment in the inner periphery of the cam-cylinder. The guide cylinder has a first portion and a second portion. The first portion corresponds to the first segment of the cam-cylinder, and the second portion corresponds to the second segment of the cam-cylinder. The wall thickness of the second portion is greater than that of the first portion such that the second portion has a higher elevation than the first portion on the outer periphery of the guide cylinder.

Furthermore, a lens barrel according to another aspect of the present invention includes a lens-holding cylinder which supports a lens and is provided with a cam-follower; and a cam-cylinder having a cam-groove which engages with the cam-follower so as to apply a driving force to the lens-holding cylinder in the optical-axis direction. The cam-cylinder has a first segment and a second segment, and the wall thickness of the first segment is greater than that of the second segment such that the first segment has a higher elevation than the second segment in the inner periphery of the cam-cylinder.

Furthermore, a lens barrel according to another aspect of the present invention includes a lens-holding cylinder which supports a lens and is provided with a rectilinear key; and a guide cylinder having a rectilinear guide opening which engages with the rectilinear key so as to guide the lens-holding cylinder in the optical-axis direction. The guide cylinder has a first portion and a second portion, and the wall thickness of the second portion is greater than that of the first portion such that the second portion has a higher elevation than the first portion on the outer periphery of the guide cylinder.

In yet another aspect, the present invention relates to a lens barrel comprising (a) a lens-supporting member comprising a cam-follower and a rectilinear key; (b) a cam-cylinder having an interior surface and a cam-groove on the interior surface, the cam-groove being arranged to engage with the cam-follower so as to apply a driving force to the lens-supporting member in the optical-axis direction; and (c) a guide cylinder which is enclosed by the cam-cylinder, the guide cylinder having a rectilinear guide opening which engages with the rectilinear key so as to guide the lens-supporting member in the optical-axis direction, wherein the cam-cylinder has a first section and a second section, both axially extending, wherein the cam-groove is on the interior surface of the first section and the interior surface of the second section, wherein an inner diameter of the cam-cylinder at the first section of the cam-cylinder, measured from the interior surface of the first section of the cam-cylinder, is less than the inner diameter of the cam-cylinder at the second section of the cam-cylinder, measured from the interior surface of the second section of the cam-cylinder, wherein the guide cylinder has a first section and a second section, both axially extending, wherein the first section of the guide cylinder corresponds to the first section of the cam-cylinder and the second section of the guide cylinder corresponds to the second section of the cam-cylinder, wherein the rectilinear guide opening is in both the first section of the guide-cylinder and the second section of the guide-cylinder, and wherein the outer diameter of the guide-cylinder at the first section of the guide-cylinder, measured from the exterior surface of the first section of the guide-cylinder, is less than the outer diameter of the guide-cylinder at the second section of the guide-cylinder, measured from the exterior surface of the second section of the guide-cylinder.

In a still further aspect, the present invention relates to a lens barrel comprising (a) a lens-supporting member which supports a lens and includes a cam-follower; and (b) a cam-cylinder having an interior surface and a cam-groove on the interior surface, wherein the cam-groove engages with the cam-follower so as to apply a driving force to the lens-supporting member in the optical-axis direction, wherein the cam-cylinder has a first section and a second section, both axially extending, wherein the cam-groove is on the interior surface of the first section and the interior surface of the second section, wherein an inner diameter of the cam-cylinder at the first section of the cam-cylinder, measured from the interior surface of the first section of the cam-cylinder, is less than the inner diameter of the cam-cylinder at the second section of the cam-cylinder, measured from the interior surface of the second section of the cam-cylinder.

In a yet further aspect, the present invention relates to a lens barrel comprising (a) a lens-supporting member which supports a lens and includes a rectilinear key; and (b) a guide cylinder having a rectilinear guide opening which engages with the rectilinear key so as to guide the lens-supporting member in the optical-axis direction, wherein the guide cylinder has a first section and a second section, both axially extending, wherein the rectilinear guide opening is in both the first section of the guide-cylinder and the second section of the guide-cylinder, and wherein the outer diameter of the guide cylinder at the first section of guide-cylinder, measured from the exterior surface of the first section of the guide-cylinder, is less than the outer diameter of the guide-cylinder at the second section of the guide-cylinder, measured from the exterior surface of the second section of the guide-cylinder.

Further objects, features and advantages of the present invention will become apparent from the following description of the preferred embodiments with reference to the attached drawings.

DESCRIPTION OF THE PREFERRED EMBODIMENT

An embodiment of the present invention will now be described with reference to the drawings.

Figure 1:
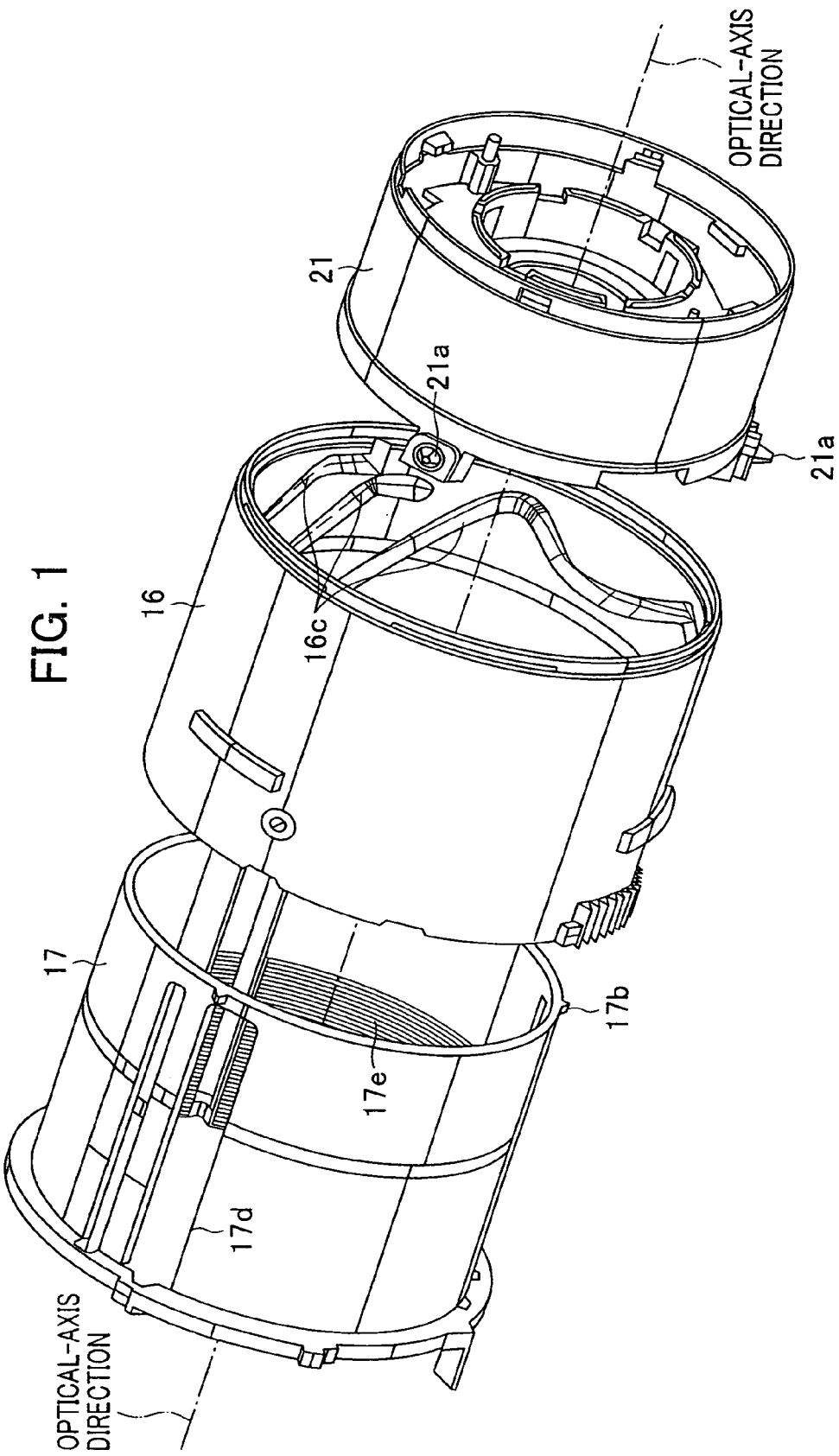
FIG. 1 is a three-dimensional perspective view of the basic structure of a lens barrel according to an embodiment of the present invention.
Figure 2:
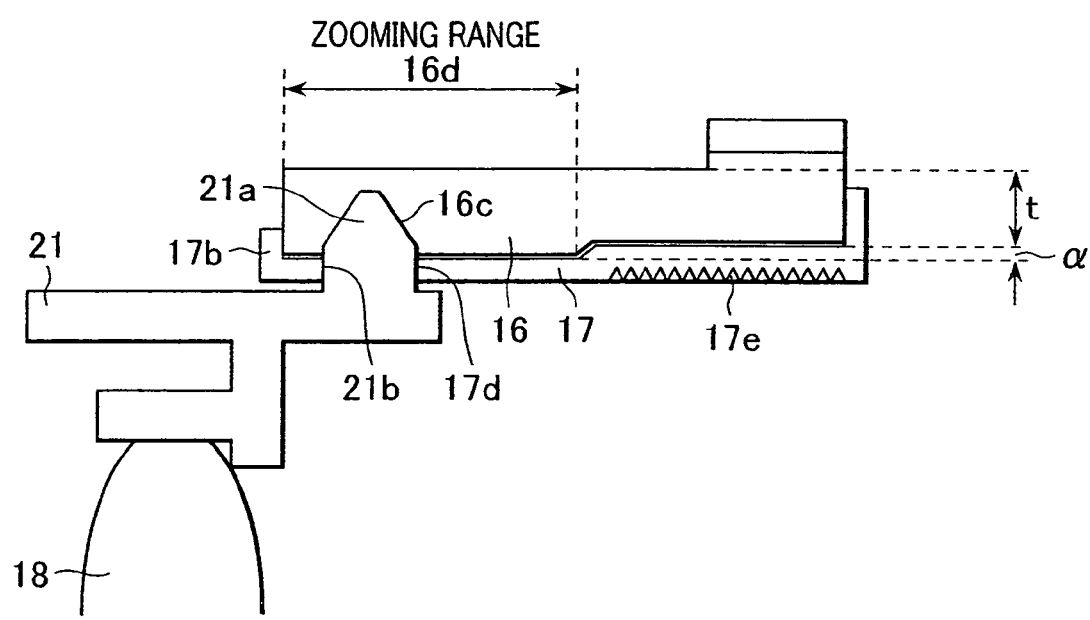
FIG. 2 is a cross-sectional view of the relevant components of the lens barrel according to the embodiment of the present invention.
Figure 4:
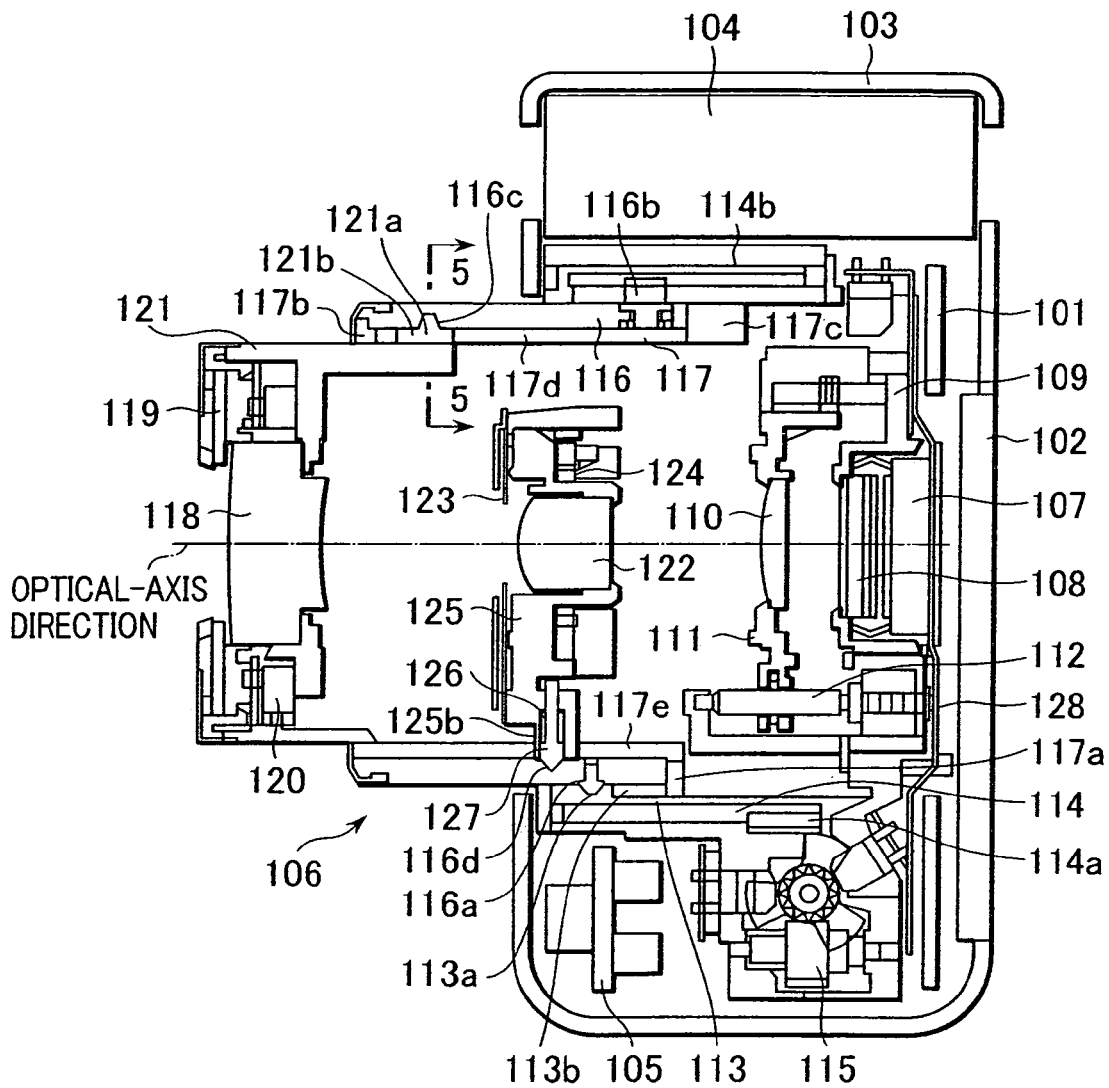
FIG. 4 is a sectional view of a camera which includes a conventional differential extensible lens-barrel having an extending/retracting function.
Figure 5:
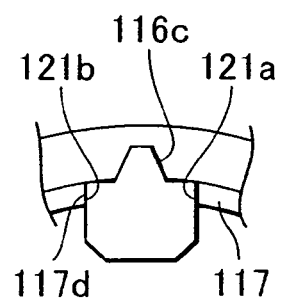
FIG. 5 is a sectional view taken along line 5—5 of FIG. 4.
Figure 6:
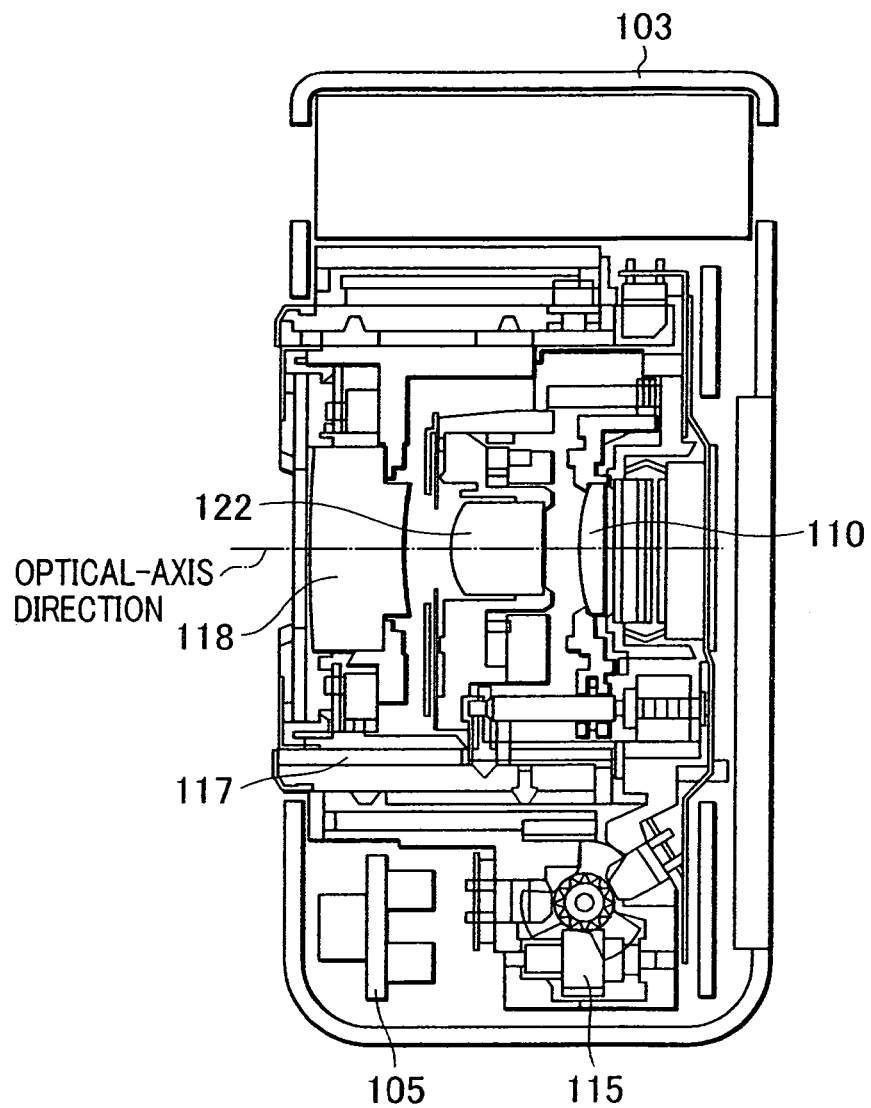
FIG. 6 is a sectional view of the camera of FIG. 4, in which the lens barrel is in its retracted state.
Figure 7:
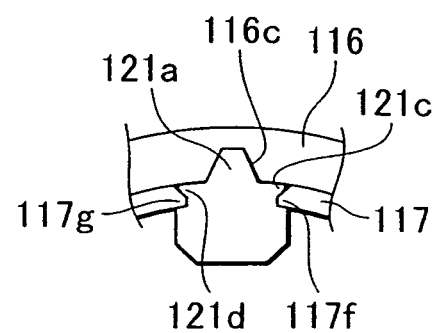
FIG. 7 is a sectional view taken along line 5—5 of FIG. 4, in which the lens barrel has an alternative structure.
Figure 8:
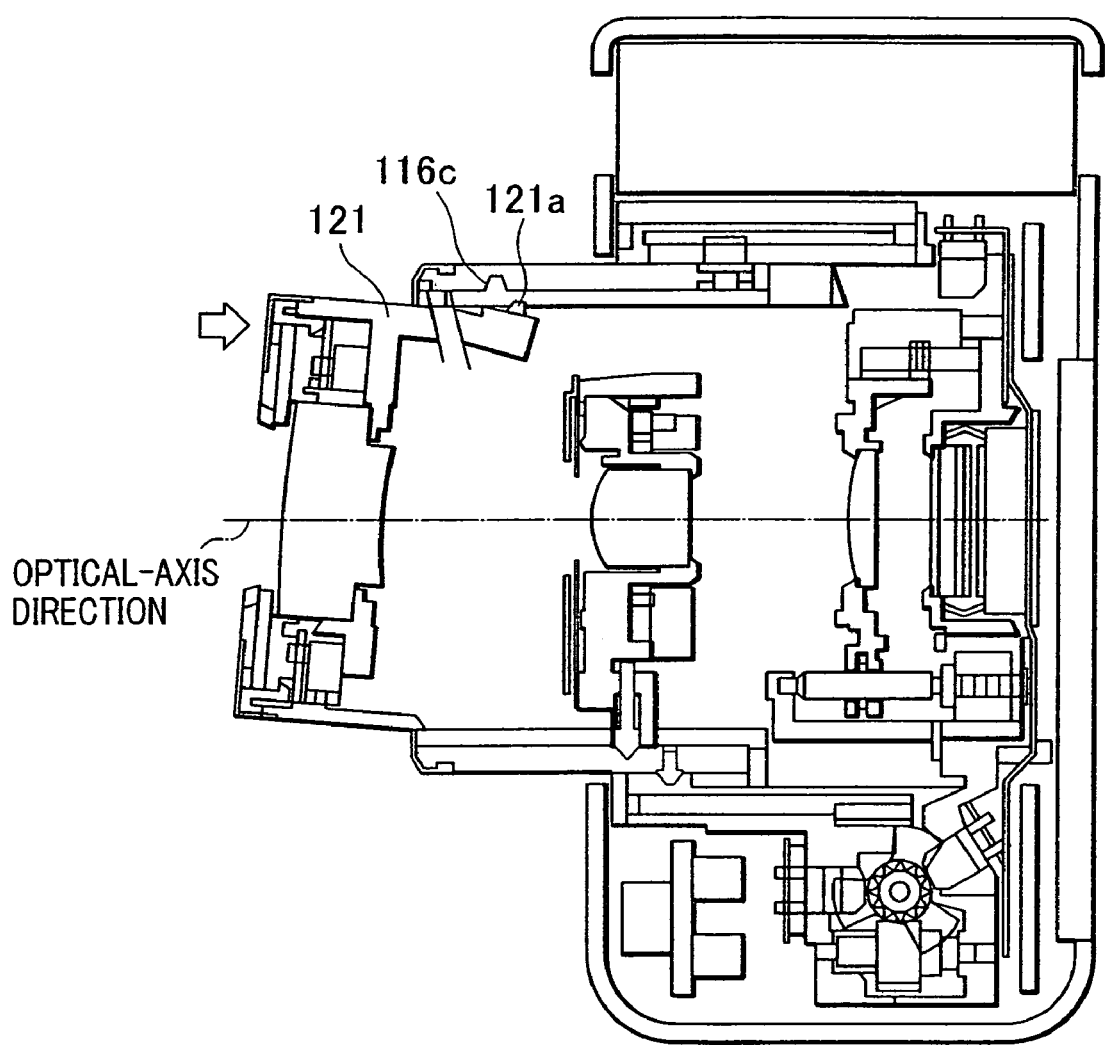
FIG. 8 is a sectional view illustrating the disadvantages existing in the conventional structure of FIG. 4 in a case where the front surface of the lens barrel is subjected to an impact.

FIGS. 1 and 2 are schematic diagrams of a lens barrel according to the embodiment of the present invention. In particular, FIG. 1 is a three-dimensional perspective view of the basic structure of the lens barrel, and FIG. 2 is a cross-sectional view of the relevant components of the lens barrel. The basic structure of the lens barrel is similar to that of the conventional one shown in FIGS. 4 to 6 provided with the differential extensible mechanism, and therefore, only the components relevant to the present invention are shown in FIGS. 1 and 2.

Referring to FIGS. 1 and 2, the lens barrel includes a cam-cylinder 16, a rectilinear cylinder 17, a first-lens-holding cylinder 21, and a first lens 18. These components respectively correspond to the cam-cylinder 116, the rectilinear cylinder 117, the first-lens-holding cylinder 121, and the first lens 118 in FIGS. 4 to 6, and have the same functions.

In detail, the first-lens-holding cylinder 21, which supports the first lens 18, is provided with three pins 21a functioning as cam followers (two of these pins are shown in FIG. 1). The three pins 21a respectively engage with three cam-grooves 16c of the cam-cylinder 16. The first-lens-holding cylinder 21 is also provided with three rectilinear keys 21b which respectively engage with three first rectilinear openings 17d of the rectilinear cylinder 17. Accordingly, when the cam-cylinder 16 is rotated, the first-lens-holding cylinder 21 is guided by cam-lift paths of the cam-cylinder 16 (i.e. the cam-lift paths of the cam-grooves 16c) and thus moves rectilinearly in the optical-axis direction (with, as described above, the rectilinear keys 21b engaging the rectilinear openings 17d). Referring to FIG. 2, the wall thickness of the cam-cylinder 16 is not consistent since there is a level difference α in the inner periphery of the cam-cylinder 16 (i.e. in the radial direction, perpendicular to the optical axis). The level difference a is set at a range appropriate for a zoom function of the camera.

Figure 3:
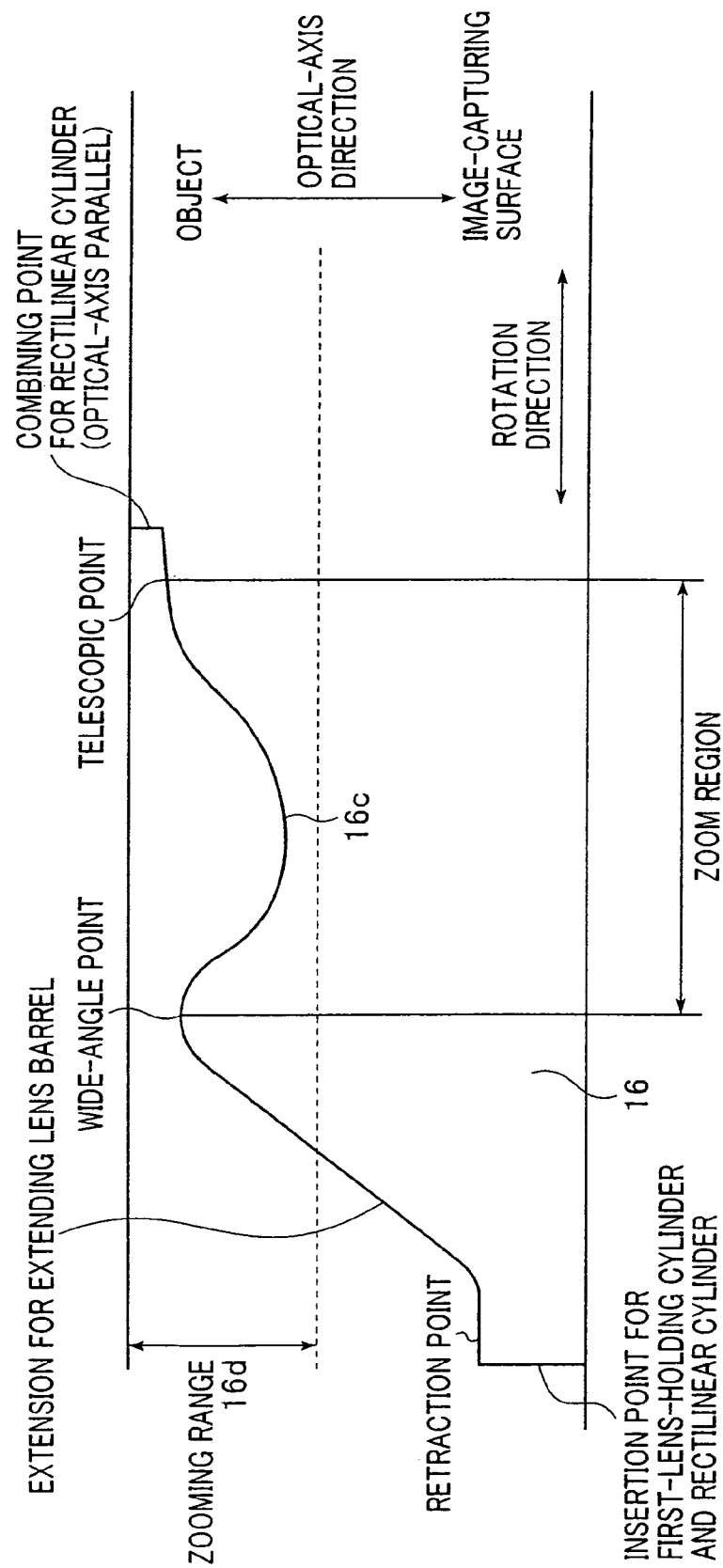
FIG. 3 is a schematic diagram illustrating the cam-lift path of one of three cam-grooves disposed in the inner periphery of a cam-cylinder according to the embodiment of the present invention.

FIG. 3 is a schematic diagram illustrating the cam-lift path of one of the three cam-grooves 16c disposed in the inner periphery of the cam-cylinder 16 for the first-lens-holding cylinder 21. The reason only one of the cam-lift paths of the cam-grooves 16c is described in FIG. 3 is to provide an easier explanation.

Generally, each cam-groove 16c is parallel to the optical axis at its end portion adjacent to the image-capturing side so that, during an assembly process of the lens barrel, the first-lens-holding cylinder 21 and the rectilinear cylinder 17 can be inserted from the side of the cam-cylinder 16 adjacent to the image-capturing surface. The cam-groove 16c then turns perpendicular to the optical axis and defines a flat portion, i.e. a retraction point. When the first-lens-holding cylinder 21 is positioned in this flat portion, the lens barrel is in a retracted state. Subsequently, the cam-groove 16c defines an extension portion where the lens barrel can be extended by a significant amount. Next to this portion, the cam-groove 16c defines a cam portion for zooming, which will be defined as a zoom region. The two end points of this zoom region are a wide-angle point and a telescopic (i.e. telephoto) point, respectively.

Furthermore, the cam-groove 16c has an optical-axis-parallel portion after the zoom region. One end of the rectilinear cylinder 17 adjacent to the first lens 18 is provided with bayonets 17b. Thus, for combining the rectilinear cylinder 17 with the cam-cylinder 16, each bayonet 17b is passed through the optical-axis-parallel portion. Accordingly, referring to FIG. 3, the zoom region in the rotation direction of the cam-cylinder 16 corresponds to an optical-axis moving range 16d, i.e. a zooming range 16d. Referring to FIG. 2, according to this embodiment, the wall thickness of the cam-cylinder 16 adjacent to an object to be photographed (t+α) is greater than the wall thickness adjacent to the image-capturing side (t) by the level difference α. Accordingly, the (t+α) wall-thickness range is set as the zooming range 16d.

During the process of taking a picture, the position of the first-lens-holding cylinder 21 is generally limited within the zooming range 16d. When the power is turned off, or when the camera is switched to an image reproduction mode, the first-lens-holding cylinder 21 moves to the flat portions of the cam-grooves 16c, i.e. the retraction points, such that the lens barrel is retracted. Accordingly, this means that if the lens barrel were to receive a large impact by, for example, dropping the camera, the pins 21a of the first-lens-holding cylinder 21 would be positioned within the zooming range 16d. Therefore, to improve the strength of the lens barrel, it is only necessary to increase the depth of the cam-grooves 16c in the zooming range 16d for the amount of the level difference α.

Furthermore, the restriction of the (t+α) wall-thickness range within the zooming range 16d prevents unnecessary reduction of the wall thickness of the rectilinear cylinder 17. In detail, as shown in FIG. 2, the portion of the rectilinear cylinder 17 corresponding to the cam-cylinder (t+α) wall-thickness range is thin compared to the portion adjacent to the image-capturing side where the rectilinear cylinder 17 is thicker by the amount of the level difference α.

According to this embodiment, the thicker portion of the rectilinear cylinder 17 is provided with light blocking grooves 17e. In detail, although there are cases where some undesired light beams entering the rectilinear cylinder 17 through the first lens 18 form a ghost image on the image-capturing surface, this is prevented by disposing the light blocking grooves 17e around the inner periphery of the rectilinear cylinder 17. The light blocking grooves 17e change the reflection angle of incident light and prevent the undesired light from forming an image on the image-capturing surface. Furthermore, as shown in FIG. 2, the light blocking grooves 17e are preferably disposed around the inner periphery of the rectilinear cylinder 17 adjacent to the image-capturing side. This is due to the fact that ghost images are usually formed by light reflection in the rectilinear cylinder 17 adjacent to the image-capturing side.

As described previously, the only time the lens barrel is subjected to a large impact is when the pins 21a of the first-lens-holding cylinder 21 are positioned within the zooming range 16d. According to this embodiment, to improve the strength of the cam-cylinder 16 in the zooming range 16d, the cam-cylinder 16 is made thicker in the radius direction in the zooming range 16d by the amount of the level difference α. On the other hand, the portion of the rectilinear cylinder 17 corresponding to the thicker segment of the cam-cylinder 16, i.e. the (t+α) wall-thickness range, is made thinner by the amount of the level difference α. This prevents the outer diameter of the lens barrel from being increased. Accordingly, a compact, lightweight lens-barrel that is durable against a large impact is provided.

Furthermore, instead of being disposed at the thinner portion of the rectilinear cylinder 17, the light blocking grooves 17e are disposed around the inner periphery of the rectilinear cylinder 17 adjacent to the image-capturing side where ghost images are usually formed (i.e. at the thicker portion of the rectilinear cylinder 17). The light blocking grooves 17e change the reflection angle of incident light to prevent the undesired light from forming ghost images.

Accordingly, this achieves a compact, lightweight lens-barrel that is durable against impact and that prevents undesired light from entering the image-capturing surface.

Except as otherwise disclosed herein, the various components shown in outline or in block form in the figures are individually well-known and the internal construction and operation are not critical either to the making or using of this invention or to a description of the best mode of the invention.

While the present invention has been described with reference to what is presently considered to be the preferred embodiment, it is to be understood that the invention is not limited to the disclosed embodiment. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A lens barrel comprising:
   a lens-holding cylinder which supports a lens and includes a cam-follower; and
   a cam-cylinder having a cam-groove which engages with the cam-follower so as to apply a driving force to the lens-holding cylinder in the optical-axis direction,
   wherein the cam-cylinder has a first segment which includes a zooming area and a second segment which includes a retraction point for the lens, the wall thickness of the first segment being greater than that of the second segment.

2. The lens barrel according to claim 1, wherein the zooming area corresponds to a zooming range for moving the lens in the optical-axis direction.

3. The lens barrel according to claim 1, wherein the outer periphery of the cam-cylinder for both the first and second segments has no difference in elevation.

4. A lens barrel comprising:
   a lens-holding cylinder which supports a lens and includes a rectilinear key; and a guide cylinder having a rectilinear guide opening which engages with the rectilinear key so as to guide the lens-holding cylinder in the optical-axis direction, wherein the guide cylinder has a first portion and a second portion which includes a groove restraining a reflection of light on an imaging surface, the wall thickness of the second portion being greater than that of the first portion.

5. The lens barrel according to claim 4, wherein the is a light blocking groove.

6. A lens barrel comprising:

a lens-supporting member comprising a cam-follower; and a cam-cylinder having an interior surface and a cam-groove on the interior surface, wherein the cam-groove engages with the cam-follower so as to apply a driving force to the lens-supporting member in the optical-axis direction, wherein the cam-cylinder has a first section and a second section, both axially extending, wherein the cam-groove is on the interior surface of the first section and the interior surface of the second section, wherein an inner diameter of the cam-cylinder at the first section of the cam-cylinder, measured from the interior surface of the first section of the cam-cylinder, is less than the inner diameter of the cam-cylinder at the second section of the cam-cylinder, measured from the interior surface of the second section of the cam-cylinders, wherein the first section of the cam-cylinder includes a zooming area, and wherein the second section of the cam-cylinder includes a retraction point for a lens.

7. The lens barrel according to claim 6, wherein the zooming area corresponds to a zooming range for moving the lens in the optical-axis direction from a wide-angle end to a telephoto end, and the second section of the cam-cylinder does not correspond to a zooming range for moving the lens in the optical-axis direction from a wide-angle end to a telephoto end.

8. A lens barrel comprising:

a lens-supporting member comprising a rectilinear key; and a guide cylinder having a rectilinear guide opening which engages with the rectilinear key so as to guide the lens-supporting member in the optical-axis direction, wherein the guide cylinder has a first section and a second section, both axially extending, wherein the rectilinear guide opening is in both the first section of the guide-cylinder and the second section of the guide-cylinder, and wherein the outer diameter of the guide-cylinder at the first section of the guide-cylinder, measured from the exterior surface of the first section of the guide-cylinder, is less than the outer diameter of the guide-cylinder at the second section of the guide-cylinder, measured from the exterior surface of the second section of the guide-cylinder, and wherein the second section includes a groove restraining a reflection of light on an imaging surface.

9. The lens barrel according to claim 8, wherein the groove is a light blocking groove.

* * * * *

UNITED STATES PATENT AND TRADEMARK OFFICE
CERTIFICATE OF CORRECTION

PATENT NO. : 7,085,074 B2  
APPLICATION NO. : 11/236715  
DATED : August 1, 2006  
INVENTOR(S) : Hiroyuki Wada Page 1 of 1

It is certified that error appears in the above-identified patent and that said Letters Patent is hereby corrected as shown below:

COLUMN 6:
Line 62, "difference a" should read --difference $\alpha$--.

COLUMN 9:
Line 9, "the is" should read --the groove is--.
Line 29, "cylinders," should read --cylinder,--.

Signed and Sealed this

First Day of July, 2008

JON W. DUDAS
*Director of the United States Patent and Trademark Office*